R. W. GOTSHALL.
THRESHING MACHINE.
APPLICATION FILED AUG. 14, 1906.

938,138.

Patented Oct. 26, 1909.
5 SHEETS—SHEET 1.

Witnesses
Harry R L White
Ray White

Inventor
Robert W. Gotshall
By Chewer & Cox
Attys

R. W. GOTSHALL.
THRESHING MACHINE.
APPLICATION FILED AUG. 14, 1906.

938,138.

Patented Oct. 26, 1909.
5 SHEETS—SHEET 4.

Witnesses
Harry R. L. White
Ray White

Inventor
Robert W. Gotshall
By Cheever & Cox
Att'ys

R. W. GOTSHALL.
THRESHING MACHINE.
APPLICATION FILED AUG. 14, 1906.
938,138.
Patented Oct. 26, 1909.
5 SHEETS—SHEET 5.
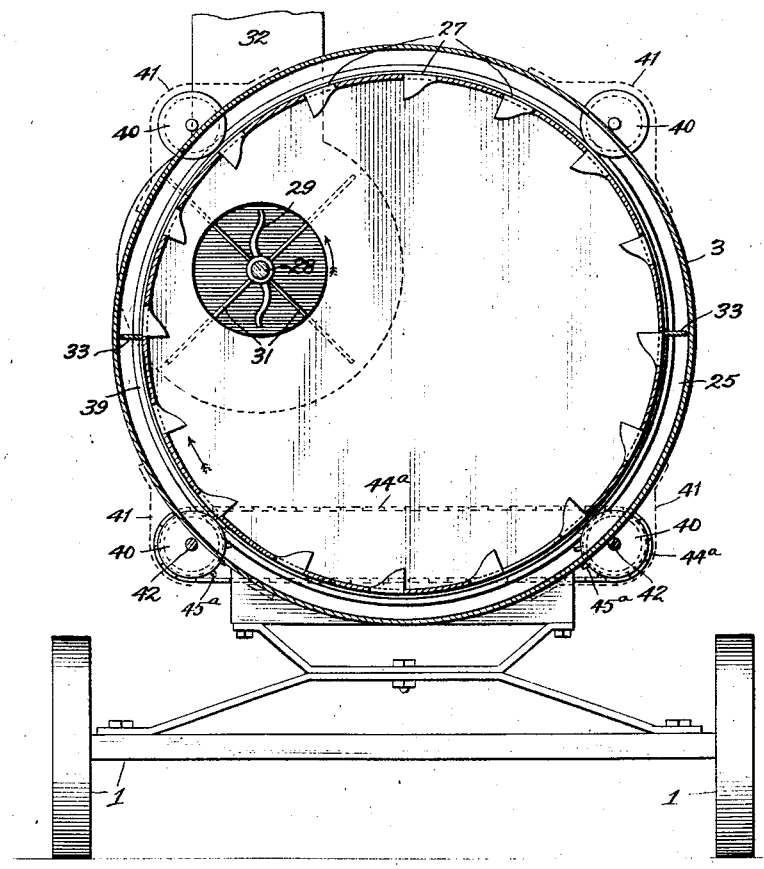
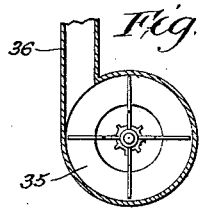
Witnesses
Harry R. White
Ray White
Inventor
Robert W. Gotshall
By Cheever & Cox
Attys

UNITED STATES PATENT OFFICE.

ROBERT W. GOTSHALL, OF TOLEDO, OHIO.

THRESHING-MACHINE.

938,138.

Specification of Letters Patent.

Patented Oct. 26, 1909.

Application filed August 14, 1906. Serial No. 330,531.

*To all whom it may concern:*

Be it known that I, ROBERT W. GOTSHALL, a citizen of the United States, residing at Toledo, in the county of Lucas and State of Ohio, have invented a certain new and useful Improvement in Threshing-Machines, of which the following is a specification.

My invention relates to threshing machines, or combined threshing and separating machines, and the general and most important object of the invention is to provide a machine capable of saving practically all of the grain in the stock, which is introduced into it.

The features of the machine which coöperate to produce the high efficiency of my machine are specifically described and explained later in this specification.

As ancillary to the main object of the invention, but of great practical importance, are the following:

First, it is an object to produce a machine which is very short and compact compared with the combined threshers and separators now in most common use; second, to provide a machine constructed almost entirely of metal, whereby the parts may be made to a practically exact standard in order that they may be interchangeable. This feature also enables the machine to be shipped "knocked down", and to be set up at the field of operation without requiring any special degree of skill. The interchangeability of the parts permits the shipment and substitution of separate parts in case of breakage, or in case any of the parts become worn out. The construction also affords great durability, so that the life of the machine is prolonged indefinitely.

The third object is to provide a machine which may be driven from a single power device, and with the expenditure of a comparatively small amount of power.

It is also an object to prevent slippage, which object is obtained by positive gearing of the parts, and also by special construction in the mountings of the separating screen, as will hereinafter more fully appear.

I attain my objects by the mechanism illustrated in the accompanying drawings in which—

Figure 1:
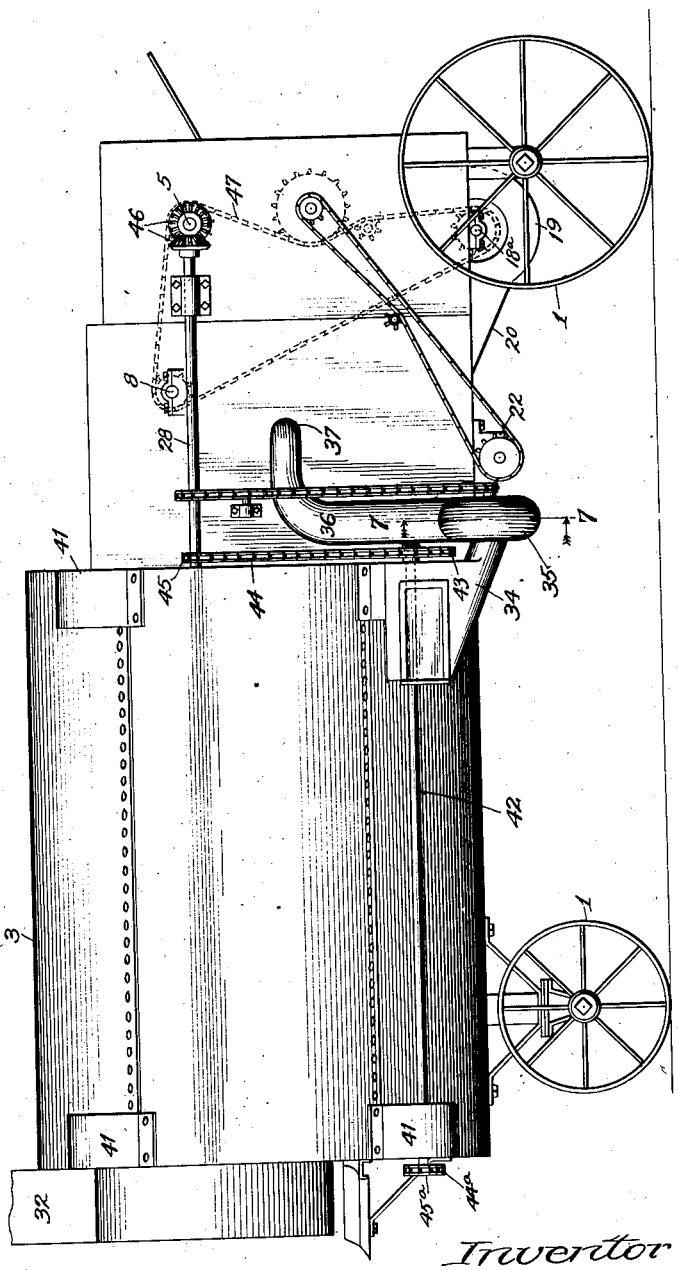
Figure 2:
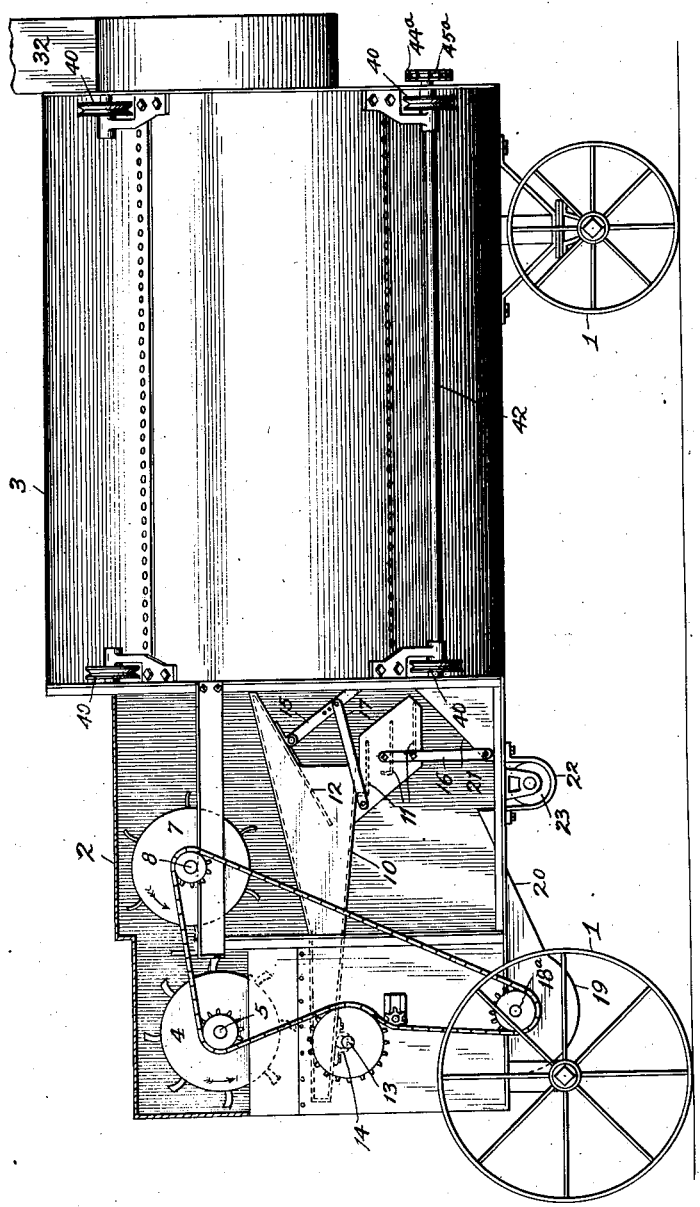
Figure 3:
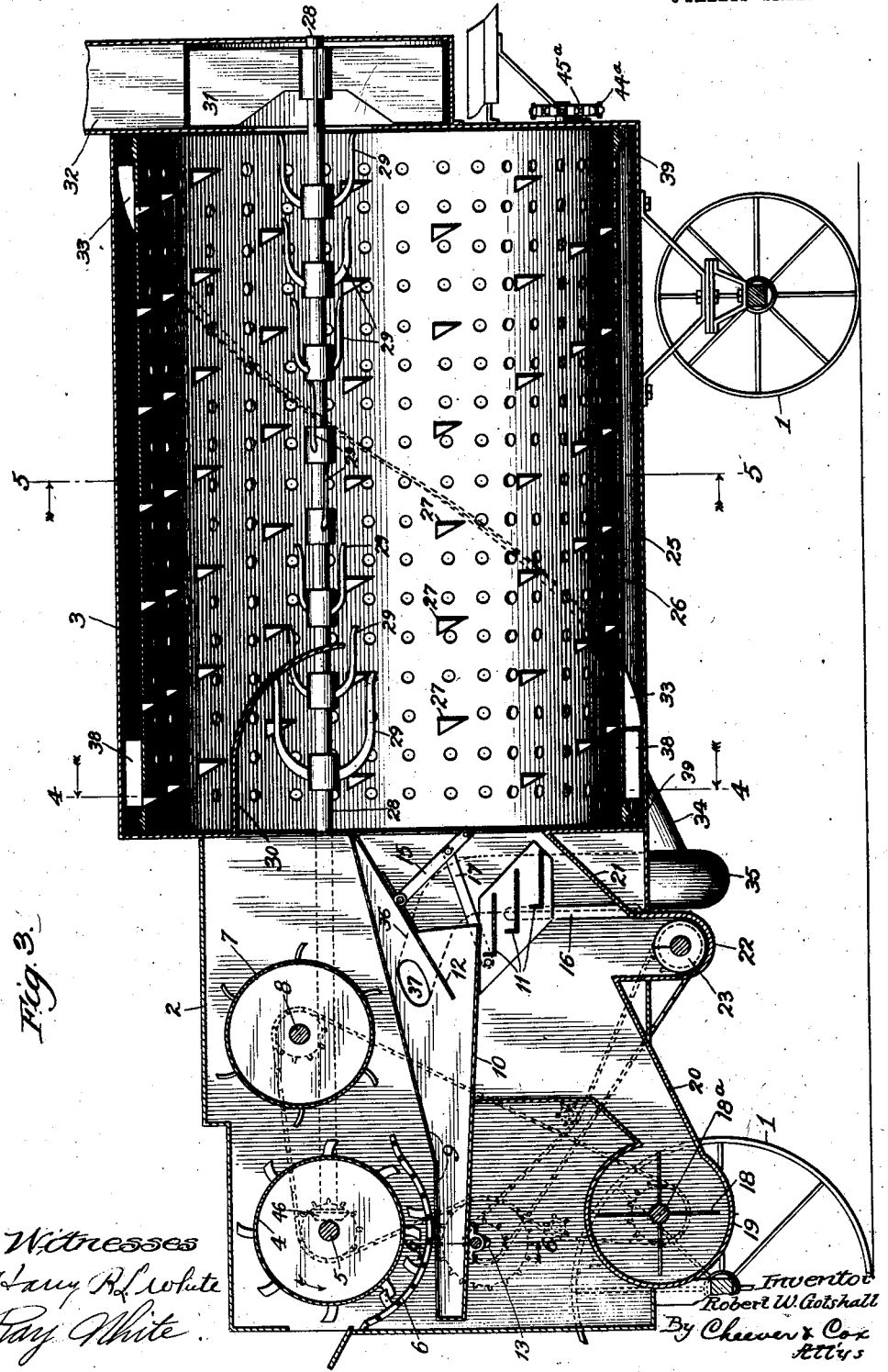
Figure 4:
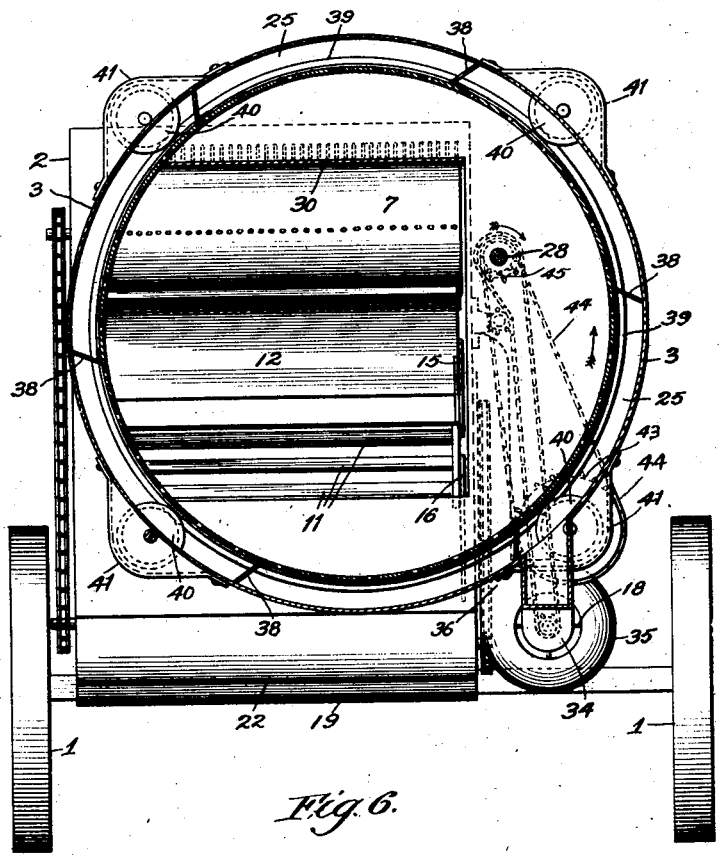
Figure 6:
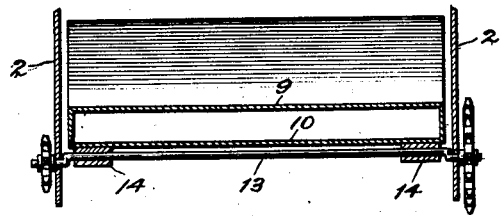

Figure 1 is a side elevation of the complete machine. Fig. 2 is a side elevation of a complete machine viewed from the opposite side and with a portion of the casing at the threshing and primary separating mechanism removed to reveal the parts within. Fig. 3 is a central sectional elevation of the machine. Figs. 4 and 5 are transverse sectional elevations taken respectively on the lines 4—4 and 5—5, Fig. 3. Fig. 6 is a detailed sectional elevation of the shaking mechanism for the shoe, the section being taken on the line 6—6 Fig. 3. Fig. 7 is a sectional detail of the fan for elevating the material saved in the secondary separator back to the primary separating mechanism.

Similar numerals refer to similar parts throughout the several views.

Referring to the drawing, the machine is mounted upon any suitable running gear 1 and the inclosing framework or casing consists in general of the housing 2, which incloses the threshing and primary separating mechanism, and the cylindrical casing 3, which incloses the rotary cylindrical screen constituting the secondary separating mechanism which will be hereinafter described.

At the receiving end of the machine in housing 2, is mounted a threshing cylinder 4, secured to shaft 5 above the concave and grating 6. The threshing cylinder and concave are of ordinary pattern and are not herein specifically claimed. Beyond said threshing cylinder is located a beating cylinder 7, mounted on shaft 8, shafts 5 and 8 being journaled in any suitable manner in the housing 2. Underneath the cylinders 4 and 7, is located a combined shoe and grain pan, which consists preferably of a board 9ª, having a perforated portion 9 forming a screen, located in position to receive the grain and such chaff as may fall thereon from cylinders 4 and 7. A grain pan 10 is located beneath the screen 9 and is adapted to deliver to the cleaning tables 11 the grain and small pieces which are received upon it. Said cleaning tables may be either perforate or imperforate, the perforate or sieve construction having some points of advantage over the imperforate construction. A second grain pan or board 12 is in the present design located near the far end of board 9, and is designed to catch the material dropping beyond pan 10 and guide such material onto said pan. The particular form of mechanism for vibrating and supporting the combined shoe and grain pan is not essential but a suitable mechanism is here shown and consists of a crank shaft 13 journaled in the housing 2 and carrying upon its eccentric portion the boxes 14 which are rigidly secured t othe pan 10 for supporting and vibrating the same. The farther extremity of the pan is supported upon the link or pivoted arm 15, one extremity whereof is pivotally secured to the housing 2, or other stationary parts of the machine. In the present form the tables 11 which are located under the discharge end of the pan are supported by the links 16 having one end rigidly secured to said tables and the other pivotally secured to the housing 2. Vibration is imparted to said shaking tables by the link 17 which connects said tables to the above mentioned link 15. These parts are best shown in Figs. 1 and 2.

The two features of my machine, to wit— the design whereby a strong blast of air may be employed in the primary cleaning device and the arrangement whereby the grain coming from the primary cleaning device is immediately segregated and removed from the machine are of great importance. As a result of the first feature the chaff which has progressed as far as the cleaning tables is practically sure to be blown over into the secondary separator hereinafter described; and as a result of the second feature there is no possibility that grain once saved shall be again mixed with the tailings where there is always a possibility of loss. The fan 18 is placed in a casing 19 which communicates with the delivery duct 20 in such manner as to force air over the shaking tables 11. The grain board 21 is adapted to receive the grain from the table 11 and guide it into casing 22 inclosing the conveyer 23. Said board has a very steep pitch as best shown in Fig. 3 and on this account and the fact that fan 18 is located below the cleaning tables, a very strong blast of air may be used without danger of blowing any of the kernels of grain beyond the cleaning tables to a point where they would be lost. The conveyer 22, 23, is located in such position relatively to tables 11 that the grain received therefrom is immediately withdrawn from the machine and is not mixed up with the other material coming from the pan 10.

I will now describe a secondary separator which consists in general of a perforated rotary screen 26 located within the casing 3 and adapted to receive material from the primary separating mechanism above described. Said screen or drum is made somewhat smaller in diameter than the casing 3 so as to leave a space or collecting chamber 25 between them for the helical flight or wiper 33 hereinafter mentioned. Said screen is provided on the inside with flights 27 which serve to advance the material toward the discharge end of the screen and also to pick up straw and chaff from the bottom of the screen and elevate it to the beater arms 29.

Extending longitudinally through screen 26 is a beater shaft 28 having thereon beater arms 29, arranged preferably in pairs and each pair being offset sidewise from the ones ahead and behind in such manner that said arms when taken as a whole have the nature of a helix; i. e., said arms would, if located very close together or if continuous form the thread of a screw arranged to progress in the same direction in which the flights 27 forward the material through screen 26.

A deflecting hood 30, which is secured to the casing 3 or other stationary part of the machine is arranged to receive the material entering screen 26 and deflect the same downward toward shaft 28 and the bottom of the screen.

The construction and arrangement of the parts just described of the secondary separating mechanism are of great importance, as I will now point out.

It will be understood that the threshing cylinder 4 and beater 7 revolve at a high rate of speed and throw the chaff and tailings from them with considerable speed toward screen 26. As this straw and chaff enter the screen they are immediately deflected downward by hood 30, whence they come into contact with the rapidly revolving beater arms 29. These arms tend to spread and agitate the stock to prevent the same from falling in the screen into a bundle or compact mass. Now the stock as it enters the screen does not fall entirely upon the bottom of the screen but in a large measure upon the sides, and as the sides are moving vertically in distinction to the approximately horizontal movement of the stock the flights 27 immediately impart thereto an upward movement which is consequently approximately at right angles to the direction of the motion of the stock as it enters the screen. Consequently the flights in engaging the stock have the effect virtually of shaking the same, which result is very efficient in shaking out the kernels of grain. This permits the grain itself to fall upon the bottom of the screen whence it may pass through the apertures in the collecting space or chamber 25 between the screen and the casing. Of course, the flights 27 have a horizontal movement at the bottom of the screen and therefore tend continually to move the straw and lighter material from the bottom of the screen, thus leaving the bottom of the screen comparatively free so that the grain itself may have ready access to the perforations and consequently pass readily through the screen. The directions of rotation of the screen 26 and shaft 28 are indicated by arrows in Figs. 4 and 5, and by reference to these figures it will be seen that the extremity of the beater arms when in closest proximity to the flights 27 move in opposite direction to said flights. As these parts move in opposite directions there is consequently great agitation of the contents of the drum which is advantageous, both on account of its threshing effect and the effect which it has to distribute the contents of the entire space within the screen.

At the discharge end of screen 26 is located means for removing the straw, and although any suitable design may be employed for this purpose, I have chosen to illustrate a wind stacker consisting of a fan 31 adapted to force the straw up and out through the pipe 32.

I will now describe an important advantageous feature of my device, to wit: the means for returning from casing 3 the grain, and what small pieces of chaff and foreign matter may have been there collected outside of screen 26. It is desirable to clean the material thus collected within chamber 25 and to do this, said material is returned to the primary separating mechanism. To collect the material from chamber 25 and advance it toward the primary separating mechanism, I mount upon the outside of screen 26 a helical flight or wiper 33 which is of such height as to scrape the inner surface of casing 3 and consequently move the contents thereof toward the receiving end of the screen. In the best form which is shown, said flight or wiper consists of a continuous piece making approximately one half of a complete circumference within the length of the screen. This, however, is a matter of design the essential feature being that there is upon the outside of the screen 26 one or more flights or wipers helically arranged and of such dimensions as to contact or approximately contact the bottom portion of the casing and advance the material therein toward the receiving end of the screen. By means of said flight or wiper 33 the material in chamber 25 is conveyed to the duct 34, best shown in Fig. 1, by which it is led to the eye of the fan 35, the discharge duct 36 whereof leads preferably to the aperture 37 in housing 2. As shown in Fig. 3 said aperture 37 is between the board 9ª and the screen pan 12 and the contents emerging through said aperture will fall upon the grain pans 10 and 12 where they will be mixed with the grain coming direct from the threshing and beating cylinders 4 and 7. It is not essential, however, that the discharge aperture 37 be here located.

In order to insure the entrance of the material at chamber 25 into the mouth of duct 34 it is desirable to provide collecting vanes 38 which, as best shown in Fig. 3 are longitudinally arranged blades secured at suitable intervals to the side of screen 26 in line with the receiving mouth of duct 34. The screen is rotatably supported upon the rollers 40 which engage the circumferential flanges 39. These rollers are preferably inclosed in housings 41 and the lower rollers are driven in the present form by means of the driving shafts 42.

One of the shafts 42 has secured thereto a driving sprocket 43 driven by means of a chain 44 which in turn is driven by a sprocket 45 secured to shaft 28 above mentioned. In order that the lower rollers may rotate together, the shafts 42 are connected by means of a chain 44ª and sprockets 45ª as best shown in Figs. 1 and 5. The lower rollers being therefore cross connected are constrained to rotate in unison, and it is found by experiment that with this construction there is practically no slippage between the rollers and the tracks 39. Consequently the rotation of screen 26 is uniform and practically positive.

Although the means by which the several parts of the machine are driven, are not essential features, the design here shown is of great practical advantage in that all of the parts are permanently and positively correlated and driven from a single belt pulley, not shown. In my design, shaft 5 is the shaft which receives power from whatever exterior source of power is employed. As best shown in Fig. 1 said shaft 5 is connected to beater shaft 28 by means of bevel gearing 46. Shaft 5 of the threshing cylinder, shaft 8 of the beating cylinder, shaft 18ª of the blowing fan and agitating shaft 13 are all provided with sprockets, and a chain 47 is led over them in such manner that the single chain produces the proper rotation of all of them. The shaft of conveyer 23, is in a similar manner geared to shaft 13 as indicated in Figs. 1, 3 and 6.

I desire to direct attention to an important feature of this machine, to wit: the fact that it is made practically in its entirety of metal. The housing 2 and casing 3 are of sheet metal as is also screen 26 and the various conveying ducts. By preference the threshing and beating cylinders 4 and 7 are also of metal and the same material is employed for the shoe 9ª and grain boards 10, 11 and 12. By thus constructing the machine entirely of metal, the risk of fire is practically eliminated and moreover the parts are practically immune from the effects of the weather. Moreover being of metal, they may more readily be made to a standard in size and configuration with the result that the parts are completely interchangeable.

I desire to point out the fact that although the beater 7 is advantageous in my machine, it is obvious that the same might be omitted without departing from the scope of the invention. It is also true that the details of construction of the combined separating shoe and grain pan and of the method of mounting the same, and also of the construction and method of mounting the cleaning tables 11, may be varied without departing from the broad spirit of the invention.

In the construction here shown, the combined shoe and grain pan is connected to, but not rigidly attached to the cleaning tables 11. These parts, however, might be rigidly secured together if desired. Other minor details of construction might also be altered as will be readily apparent to those skilled in the art.

In the description and claims by the term "cleaning device" is meant the cleaning tables 11 and parts which work with the aid of a blast of air. The primary separating machanism is comprised of those parts which precede the cleaning device and the secondary separating mechanism is comprised of the parts which receive the tailings from the cleaning device.

Having thus described my invention, what I claim as new and desire to secure by Letters-Patent is:—

1. In a threshing machine the combination of a threshing mechanism, a primary separating mechanism, a cleaning device, a rotating screen and a casing therefor comprising a secondary separating mechanism so located as to receive from the primary separating mechanism and the cleaning mechanism the straw and chaff discharged therefrom, for re-treatment in said secondary separating mechanism, a duct for removing the cleaned grain from the machine, said duct being located beneath said cleaning device in position to receive the cleaned grain dropping therefrom, and means for forcing a blast of air past the material falling from said cleaning device to thereby blow everything except the cleaned grain into the rotary screen and prevent it from falling into said duct.

2. In a threshing machine the combination of threshing mechanism, a vibrating shoe including a perforated plate or screen in position to receive material from said threshing mechanism, cleaning tables located to receive grain from said shoe, means located beneath said cleaning tables for receiving cleaned grain therefrom and removing it from the machine, a rotary cylindrical separating screen and a fan for directing a blast of air past said tables, the parts being so located that the tailings from said tables pass into said screen.

3. In a threshing machine, a threshing cylinder, a screen adapted to receive material therefrom, a grain pan beneath said screen, cleaning tables in position to receive material from said pan, said screen and pan and tables being all movable and connected together whereby a single power device may operate them all.

4. In a threshing machine, a threshing cylinder, a shoe comprising a screen beneath said cylinder, and a pan beneath said screen, and cleaning tables adapted to receive material from said pan, said screen, pan and tables being all connected together whereby a single power device may shake them all.

5. In a threshing machine, a threshing cylinder and concave, a screen located beneath said concave in position to receive material therefrom, a grain pan beneath said sieve, cleaning tables in position to receive material from said pan, said screen and pan and tables being all movable and connected together whereby a single power device may shake them all and a power device connected to one of said shaking parts.

6. In a threshing machine, a threshing cylinder, a shoe provided with a screen beneath said cylinder, and a pan beneath said screen, cleaning tables adapted to receive material from said pan, said screen, pan and tables being all connected together whereby a single power device may shake them all, and a fan adapted to force a blast of air past said tables for the purpose described.

7. In combination, a threshing cylinder, a concave beneath the same, a rotary separating screen, a vibrating shoe for receiving material from said concave, cleaning tables secured to and vibrating with said shoe and a blast fan, the parts being so arranged in front of said rotary screen that the blast from said fan blows the chaff from the cleaning tables into said screen.

8. In combination, a threshing cylinder, a concave beneath the same, a vibrating shoe beneath said cylinder and concave and a rotary cylindrical separating screen adapted to receive the tailings from said shoe, and a set of cleaning tables located between said shoe and said screen and adapted to receive partially cleaned grain from said shoe.

9. In combination, a threshing cylinder, a concave beneath the same, a rotary cylindrical separating screen, adapted to receive material directly from said threshing cylinder, a vibrating shoe beneath said concave, cleaning tables associated with said shoe, and a blast fan, the parts being so arranged in front of said screen, that the blast from said fan blows the chaff from the cleaning tables into said screen.

10. In combination, a threshing cylinder, a concave beneath the same, a rotary separating screen, a vibrating shoe beneath said concave, cleaning tables beneath said shoe, a blast fan, the parts being so arranged in front of said screen that the blast from said fan blows chaff from the cleaning tables into said screen, a conveyer located between said tables and screen and adapted to receive the cleaned grain from said cleaning tables and at once remove it from the machine, and means for bringing back to said tables the material saved from said screen.

In witness whereof, I have hereunto subscribed my name in the presence of two witnesses.

ROBERT W. GOTSHALL.

Witnesses:
C. J. GOTSHALL,
N. H. BONEO.